(12) United States Patent
Knudsen et al.

(10) Patent No.: US 7,202,425 B2
(45) Date of Patent: Apr. 10, 2007

(54) UNDER-PILLOW-BLOCK LOAD CELL

(75) Inventors: Jens H. Knudsen, Kolding (DK); Garett E. Lefebvre, Freeport, ME (US); Barry C. Rhodes, deceased, late of Portland, ME (US); by Kimerleigh Barry, legal representative, Portland, ME (US)

(73) Assignee: The Montalvo Corporation, Gorham, ME (US)

( * ) Notice: Subject to any disclaimer, the term of this patent is extended or adjusted under 35 U.S.C. 154(b) by 97 days.

(21) Appl. No.: 11/105,125

(22) Filed: Apr. 13, 2005

(65) Prior Publication Data

US 2006/0231296 A1    Oct. 19, 2006

(51) Int. Cl.
*G01G 3/08* (2006.01)
*G01G 3/14* (2006.01)

(52) U.S. Cl. ............... 177/211; 177/229; 73/862.625

(58) Field of Classification Search ............... 73/862.625–862.639; 177/229, 211
See application file for complete search history.

(56) References Cited

U.S. PATENT DOCUMENTS

| | | | | |
|---|---|---|---|---|
| 3,260,106 A | * | 7/1966 | Hull et al. ............. | 73/862.474 |
| 3,763,701 A | * | 10/1973 | Wright et al. ........... | 73/862.474 |
| 3,824,846 A | * | 7/1974 | Andersson ................... | 73/781 |
| 4,326,424 A | | 4/1982 | Koenig | |
| 5,186,061 A | * | 2/1993 | Montalvo et al. ....... | 73/862.632 |
| 5,483,883 A | * | 1/1996 | Hayama .................. | 101/128.4 |
| 5,777,240 A | * | 7/1998 | Lefebvre et al. ....... | 73/862.634 |
| 6,122,978 A | | 9/2000 | Callendrier | |
| 6,422,096 B1 | * | 7/2002 | Bulat .................... | 73/862.381 |

* cited by examiner

*Primary Examiner*—Randy W. Gibson
(74) *Attorney, Agent, or Firm*—Patricia M. Mathers; Thomas L. Bohan

(57) ABSTRACT

An under-pillow bearing (UPB) load cell for controlling tension in the winding process for a continuous web of material. The load cell has a deflection and sensor assembly that is quickly and easily removable from the load cell for maintenance and repair. The deflection and sensor assembly includes a load beam that is insertable into the load cell. In one embodiment, a pluggable sensor insert may be inserted into or removed from the load beam, without removing any of the fasteners that mount the load cell to the machine support.

15 Claims, 5 Drawing Sheets

UNDER-PILLOW-BLOCK LOAD CELL

BACKGROUND INFORMATION

1. Field of the Invention

The invention relates to the field of measuring apparatus. More particularly, the invention relates to the apparatus for measuring and indicating the tension on a continuous web in a web-winding process.

2. Description of the Prior Art

In a typical web-handling process, a continous web of material is guided over and under a series of tension rollers at high speed as the web is unwound or wound into a finished product. The material may be any thin, flexible material, such as paper, film, metal, etc. Maintaining proper tension on the web is critical in obtaining an evenly and tightly wound roll and/or product. Load cells are typically mounted at the ends of the tension rollers to measure the tension on the web as it moves past the tension roller and generate signals proportional to the magnitude of the tension. Control apparatus continuously adjust the web-winding machinery as a function of the output signals, to ensure that a closely toleranced tension is exerted on the continuous web.

One type of load cell used in the typical web-winding process is an "under-pillow-block" (UPB) load cell that is mounted beneath the pillow block bearing of the tension roller and which is hereinafter referred to as a UPB load cell. The conventional UPB load cell comprises a body with a removable pillow block plate, a load beam, a hinge, and a bottom plate that has mounting flanges at two ends for mounting the UPB load cell to a machine support, such as a stanchion or pillar. The load beam and hinge are assembled between the body and the bottom plate. The load beam assembly includes a cantilevered load beam that is fixedly mounted at one end to a mounting block and to the machine support. The free end of the beam is assembled between two roller pins. Depending on the load applied to the load cell, the body deflects the load beam and the hinge. The free end of the load beam bears the load and deflects as the body moves toward it, while the hinge pivots accordingly about a pivot point.

Conventional strain gauges are applied to the load beam in a bridge configuration in order to obtain output signals that are proportional to the tension on the web. The output signals are used to regulate operation of devices that control the torque of the web-winding process, such as pneumatic brakes or torque regulators on a winding shaft.

The conventional UPB load cell has several disadvantages. Mounting the load beam is a time-consuming task that requires extremely precise assembly of the various mounting components and shims, with sophisticated measuring and adjustment steps. Thus, repair or maintenance work on the load beam assembly generally requires a person of special skills and special tools. Consequently, the load beam assembly or the sensors, which constitute only a fraction of the overall weight of the load cell, but which are typically the part of the load cell that require maintenance or repair, generally cannot be serviced or repaired in the field. If the load beam or the sensors require maintenance or repair, the entire load cell is removed from the production line and sent back to the load cell manufacturer or designated facility. In order to hold costly downtime to a minimum, the production facility is obliged to keep spare load cells in stock.

The conventional UPB load cell, with its removable top mounting plate, mounting block, and bottom plate, has unnecessary bulk and weight, which add to the expense of manufacturing, shipping and handling the load cell. In addition to these disadvantages, the combination of the three separate plates results in a height dimension that significantly influences the bending moment that a load exerts on the load cell and that must be compensated for when mounting the load cell in the production line.

UPB load cells are frequently used in wet environments and, for this reason, a high ingress protection (IP) rating is desirable. With the conventional UPB load cell, the load beam and hinge are fastened to the top mounting plate, from the top of the plate, with bores extending from the top of the load cell down through the body and through the load beam. This provides avenues of ingress into the area of the load beam that carries sensors and electrical connections. A UPB load cell construction that eliminates or significantly reduces the avenues of ingress and therefore improve the IP rating over that of the conventional UPB load cell is desirable.

What is needed, therefore, is a UPB load cell that provides ready access to the load beam and sensors, simplifies assembly and adjustment, and enables in-field replacement of the load beam and/or sensors. What is further needed is such a UPB load cell that provides greater ingress protection. What is yet further needed is such a UPB load cell that is lighter in weight and more cost-efficient to manufacture.

BRIEF SUMMARY OF THE INVENTION

For the reasons cited above, it is an object of the present invention to provide a UPB load cell that provides ready access to the load beam and sensors, simplifies assembly and adjustment, and enables in-field replacement of the load beam and sensors. It is a further object to provide such a UPB load cell that improves ingress protection. It is a yet further object to provide such a UPB load cell that is lighter in weight and more cost-effective to manufacture.

The objects of the invention are achieved by providing a modular UPB load cell that comprises three major components: a load cell body, a deflection and sensor module, and a hinge. The load cell body is a monoblock that eliminates several mounting components of the conventional UPB load cell. One end of the deflection and sensor module, for example, is bolted to the underside of the load cell body and the other end mounted directly on the machine support. The hinge is similarly mounted on the load cell body and the machine support. This eliminates the need for the roller pins of the conventional assembly and the bottom plate. The pillow block bearing is bolted directly to the upper surface of the load cell body, which eliminates the need for the conventional mounting flanges lateral to the load cell body. This construction effectively reduces the overall height and weight of the modular UPB load cell to less than 50% of that of the conventional UPB load cell and shortens the overall length of the modular UPB load cell to the length of the load cell body. It also eliminates the need for the separate top and bottom mounting plates of the conventional UPB load cell. In some processes, it is critical that the continuous web come off the shaft at a particular angle relative to a subsequent apparatus, such as a web slitter. In such cases, spacer blocks or a higher pillow bearing may be used to raise the overall height of the pillow bearing. The reduced height of the load cell is a significant advantage, because adding spacer blocks to an assembly is a much simpler task than removing material from the machine support to reduce the height. In some cases, it may be desirable to mount the load cell according to the invention in the same bolt holes used for the conventional load cell. In this case, the load cell may be mounted on an adapter plate that bolts to the bolt-hole layout of the conventional load cell.

A key feature of the modular UPB load cell according to the invention is that the deflection and sensor module is quickly and easily replaceable. In a first embodiment of the UPB load cell according to the invention, the deflection and sensor module comprises a deflection device with an outer end, an inner end, and a load beam therebetween, and sensors that are applied directly to the load beam. The primary sensors used in the load cell are conventional strain gauges. Other sensors, such as temperature sensors, may also be applied and, as used hereinafter, the term "sensors" or "sensing devices" shall encompass strain gauges, as well as various other types of sensors. The outer end of the deflection device is rigidly attached to the machine support, a rigid, non-deflecting surface, when the load cell is mounted on the machine support. The inner end of the deflection device and the inner end of the hinge are attached to the underside of the load cell body. When load is applied to the load cell, the load cell body deflects the deflection device and the hinge. The hinge deflects about its pivot point. The inner end of the deflection device bears the entire applied load and deflects. This causes the load beam to deflect in an S-curve, with an outer portion of the load beam being in tension and the inner portion in compression. Because the load beam has an S-curve deflection, there are four possible configurations for mounting the pair of strain gauges on the load beam to measure tension and compression. Due to the wet environment in which load cells are used, it is advantageous to be able to mount the strain gauges for both tension and compression on the just upper surface of the load beam, as this moves the strain gauges away from the bottom of the load cell, where it may possibly be damaged when assembling or disassembling the load cell. This also protects the strain gauges from any direct stream of water or other fluid when the production equipment is being hosed down. The front and rear sides of the modular UPB load cell are enclosed with protective shields or panels.

The sensors, strain gauges as well as other types of sensors, such as temperature sensors, may be mounted directly on the load beam. In this case, they are encapsulated in a water-impermeable mass, such as an epoxy seal, which provides a high degree of protection against dust and/or water. The leads from the sensors lead through a small bore in the load beam and may be connected to a strain relief connector mounted on the outer surface of the load beam, or directly to a pigtail type lead. This first embodiment of the modular UPB load cell has proven to function reliably under conditions that correspond to an IP rating of 67.

Replacement of the deflection and sensor module in the field is quick and easy. Should the load beam or sensors fail or require maintenance, fasteners that mount the load cell to the machine support are removed and the pillow block bearing lifted away from the machine support, together with the modular UPB load cell. Generally, an overhead hoist is available for tasks such as this. The underside of the deflection and sensor module is now readily accessible and easily detachable from the underside of the load cell body. The process to remove or replace the deflection and sensor module requires only those skills and tools typically available in a production facility. The faulty or maintenance-ready deflection and sensor module may then be shipped to the designated facility for repair or maintenance. The ability to replace the deflection and sensing module in the field is a great advantage, because the deflection and sensor module comprises only about 10% of the total weight of the modular UPB load cell, and thus, is easier to handle and less expensive to ship than the complete deflection and sensor assembly. Furthermore, the production facility need maintain only a surplus stock of deflection and sensor assemblies, rather than entire load cells, thus reducing inventory space and costs for spare parts.

In a further development of this first embodiment, the deflection and sensor module includes a load beam and a separate sensor assembly. The sensors are mounted on a plug-in sensor rod that is insertable into a sensor bore in the load beam. The sensor bore extends the length of the load beam. When the sensor assembly is plugged into the sensor bore, the outer end of the sensor assembly is securely held in the outer end of the load beam and the inner end of the sensor rod, which extends the length of the sensor bore into the tongue, is securely held in the inner end of the load beam. With this construction, the sensor rod deflects in an S-curve, corresponding to the S-curve deflection of the load beam. The sensor assembly is a modular component that is easily plugged into or unplugged from the load beam, without having to remove any part of the modular UPB load cell from the machine support, without having to remove any fasteners that mount the load beam or hinge to the machine support, and without requiring any special tools. The sensor assembly weighs much less than the entire deflection and sensor module and the ability to replace a sensor assembly in a modular UPB load cell in the field greatly facilitates repair and reduces shipping and handling costs. As mentioned previously, the load beam is the primary load-bearing element in the deflection and sensor module and, because the sensor assembly does not have to bear the applied load, it may be constructed of a lighter or softer material that will flex as the load beam deflects. Thus, the sensor assembly may be constructed of aluminum, or other suitable lightweight materials, further reducing the cost and the weight of the component that is most frequently replaced and shipped.

A second embodiment of the modular UPB load cell according to the invention includes a deflection and sensor module that is removable from the modular UPB load cell by releasing the deflection and sensor module from the underside of the load cell body. In this second embodiment, the UPB load cell comprises four major components: a load cell body, an elongated deflection and sensor module, an elongated hinge, and a retainer body. The elongated deflection and sensor module encompasses a deflection device that has an outer end, an inner end with an extension or a "tongue," and a load beam that extends between the outer end and the tongue. The elongated hinge also has an outer end, an inner hinge end with a tongue, and a hinge point therebetween. The retainer body is a plate that has two forked or flanged ends for receiving the tongue of the deflection device in one fork and the tongue of the hinge in the other fork. The tongue and forks are attachable together to the underside of the load cell body with a single series of fasteners that are inserted into blind tapped holes in the underside of the load cell body. The outer ends of the load cell and the hinge are bolted directly to the machine support or to spacer blocks.

The entire deflection and sensor module in this second embodiment is removable from the load cell by removing the fasteners that mount the outer end of the deflection device to the machine support and the single series of fasteners that mount the tongue and fork to the load cell body. The sensors are mounted directly onto the load beam or on a sensor assembly as described above with the first embodiment.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, the drawings provide a complete disclosure and fully convey the scope of the invention to those skilled in the art.

Figure 9:
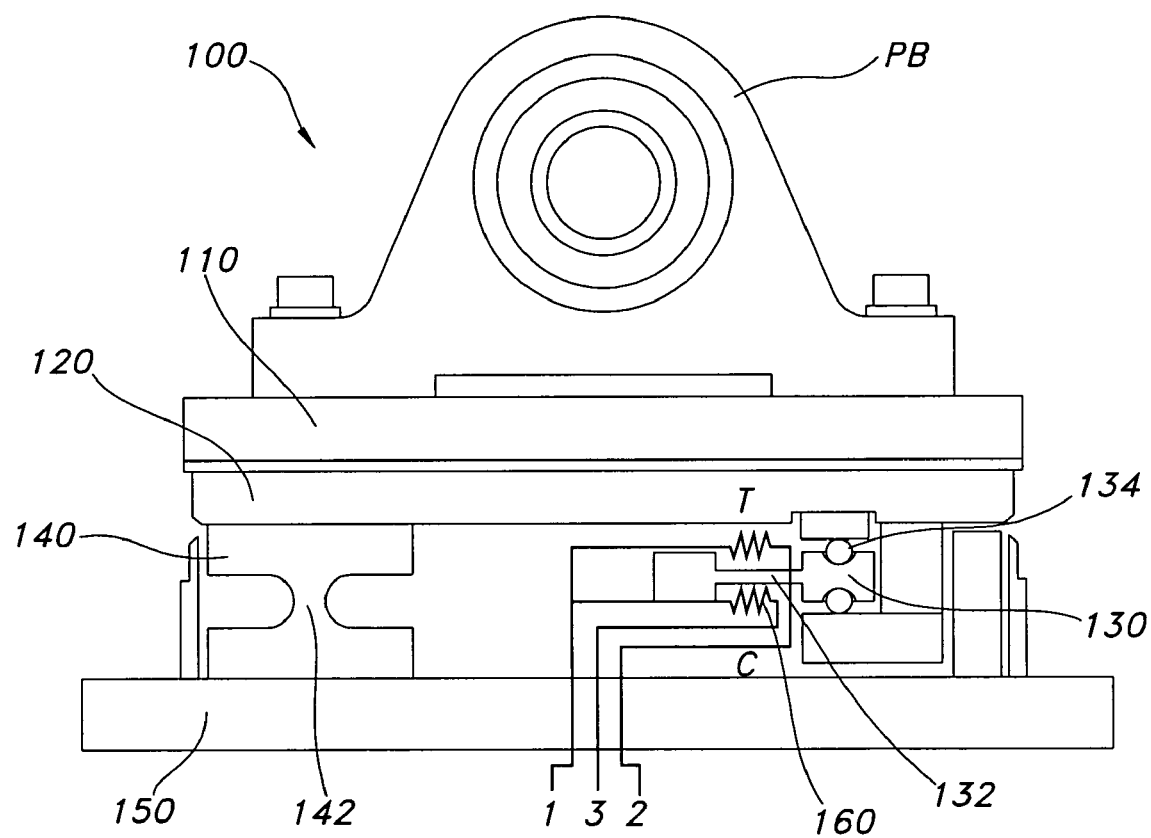
FIG. 9 is an illustration of the conventional UPB load cell (prior art).

FIG. 9 (prior art) illustrates a conventional UPB load cell 100, which comprises a removable pillow block plate 110, a mounting block 120 with a load beam assembly 130, a hinge 140, and bottom plate 150. The bottom plate 150 has flanges at its two ends for mounting the conventional UPB load cell 100 to a machine support, such as a stanchion or pillar. The hinge 140 is mounted between the mounting block 120 and the bottom plate 150. The load beam assembly 130 includes a cantilevered load beam 132 that is fixedly mounted at one end to the bottom plate 150. The free end of the load beam 132 is assembled between roller pins 134 that are held between blocks that are attached to the bottom of the mounting block 120. The free end of the load beam 132 bears the load applied to the load cell 100 and deflects in the direction of the applied load, while the hinge 140 pivots accordingly about a pivot point 142. Conventional strain gauges 160 are applied to the load beam 132.

Figure 1:
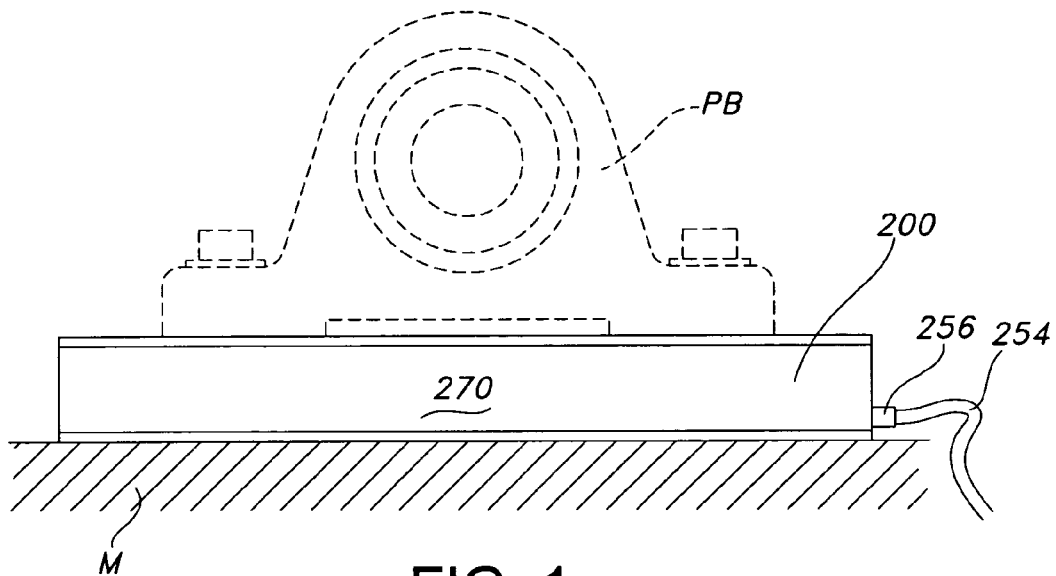
FIG. 1 is a perspective view of a conventional pillow block bearing mounted on a modular UPB load cell according to the invention.

FIG. 1 provides a general illustration of a conventional pillow block bearing PB (drawn in dashed lines) mounted on a modular UPB load cell 200 according to the invention, which is mounted on a machine support M. The modular UPB load cell 200 has a relatively flat profile, without mounting flanges lateral to the body of the load cell for mounting it to the machine support M. All four sides of the modular UPB load cell 200 are covered with protective shields or panels 270. An external connector means 256 connects the load cell 200 to a torque regulator or other control device (not shown). In the embodiment shown, the external connector means 256 includes an external cable 254.

Figure 2:
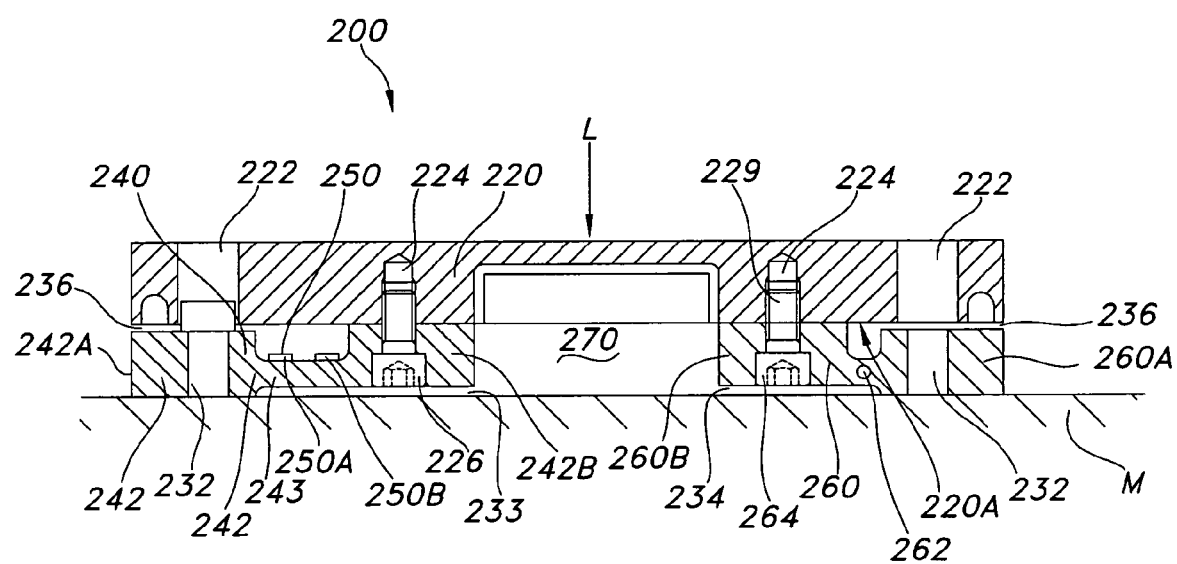
FIG. 2 is an illustration of the first embodiment of the modular UPB load cell according to the invention.

FIG. 2 illustrates a first embodiment of the modular UPB load cell 200 according to the invention, which comprises three primary components: a monoblock load cell body 220, a deflection and sensor module 240, and a hinge 260 with a hinge pivot 262. In this embodiment, the deflection and sensor module 240 includes a deflection device 242 and a plurality of sensors 250. The deflection device 242 has an outer device end 242A, an inner device end 242B, and a load beam 243 therebetween. The hinge 260 has an outer hinge end 260A, an inner hinge end 260B, with the hinge pivot 262 therebetween. Shown mounted on the load beam 243 are the sensors 250, and particularly, a first strain gauge 250A and a second strain gauge 250B that measure tension and compression, respectively, on the load beam 243 when a load L is applied. Other sensors 250, such as a temperature sensor, may also be mounted on the load beam 243.

The outer device end 242A and the outer hinge end 260A are mountable directly on the machine support M by means of a mounting fastener (conventional fastener, not shown) that is insertable through a a clearance bore 222 in the load cell body 220 into a first lower through-bore 232. A plurality of such bores 222 and 232 are provided in the outer device end 242A of the deflection device 242 and in the outer hinge end 260A of the hinge 260. When the modular UPB load cell 200 is mounted on the machine support M, the outer device end 242A and the outer hinge end 260A are fixedly mounted flush against the machine support M. This method of mounting the load modular UPB load cell 200 to the machine support M eliminates the need for the conventional mounting flanges lateral to the load cell body 220, and also reduces the number of bores and fasteners required to assemble and mount the deflection device and the hinge. This effectively shortens the overall length of the modular UPB load cell 200 to the length of the load cell body 220, simplifies the manufacturing of the various components, and reduces the overall weight of the modular UPB load cell 200 load cell by greater than 50%, relative to the weight of the conventional load cell.

With continuing reference to FIG. 2, the inner end 242B of the deflection device 242 is fixedly attachable against the underside 220A of the load cell body 220 by means of an inner fastener (conventional fastener, not shown) that is insertable through a second lower through-bore 226 provided in the inner end 242B of the deflection device 242 into a blind tapped hole 224 provided in an underside 220A of the load cell body 220. The inner end 260B of the hing 260 is similarly attachable against the underside 220A of the load cell body 200. A plurality of second lower through-bores 226 and blind tapped hole 224 are provided in the underside 220A of the load cell body 220.

Figure 3:
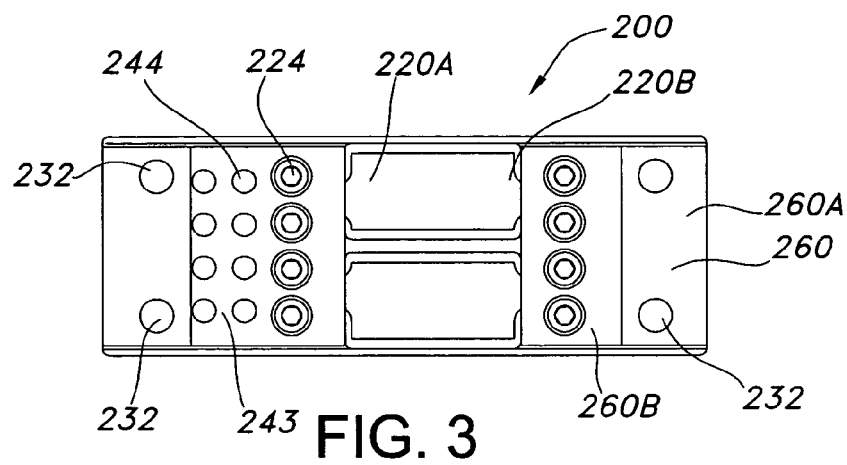
FIG. 3 is a plane view of the underside of the load cell body.

FIG. 3 is a plane view of the bottom of the modular UPB load cell 200, showing the underside 220A of the load cell body, the lower surface of the deflection device 242 and the lower surface of the hinge 260. A series of deflection bores 244 may be provided in the load beam 243 to obtain the desired degree of deflection of the load beam 243 under certain expected loads. Also shown are recesses 220A formed in the casting for the load cell body 220, which further reduce the overall weight of the modular UPB load cell 200.

Figure 4:
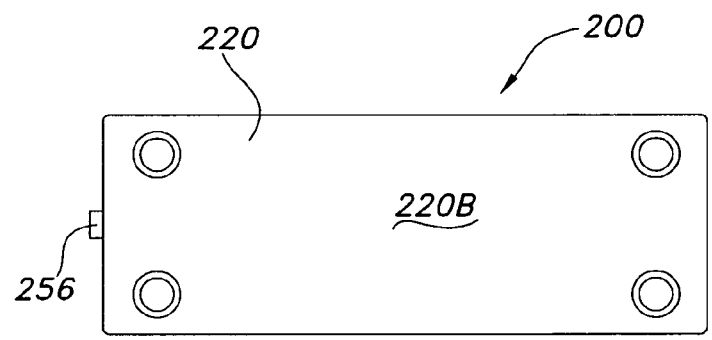
FIG. 4 is a top plane view of the modular UPB load cell of FIG. 2, showing a solid plate, with only four mounting bores at outer ends for attaching the load cell to the machine support.

FIG. 4 is a top plane view of the modular UPB load cell 200, showing the clearance bores 222 and the upperside 220B of the load cell body 220. No other bores are provided in the upperside 220 of the load cell body 220.

Figure 4A:
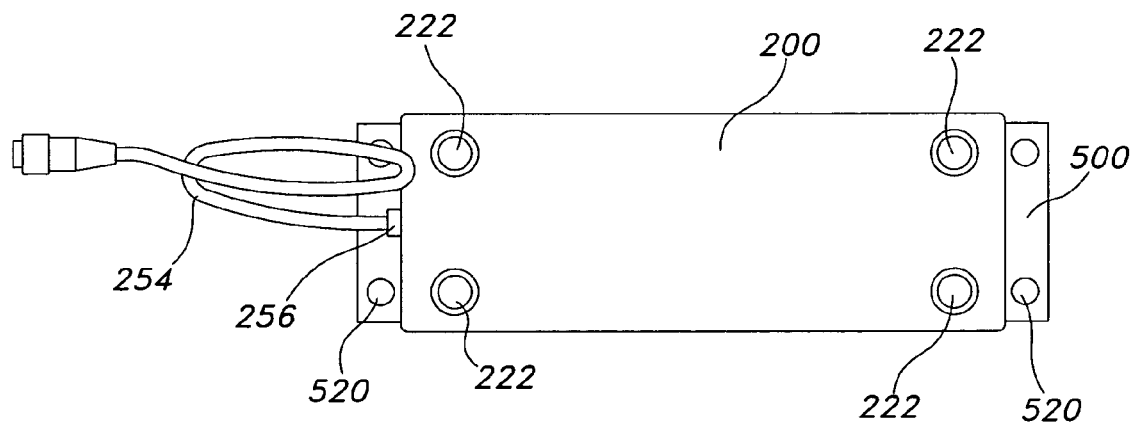
FIG. 4A is a top plane view of the UPB load cell of FIG. 2, mounted on an adapter plate.

FIG. 4A is a top plane view of the modular UPB load cell 200 mounted on an adapter plate 500. The adapter plate 500 is provided to allow the modular UPB load cell 200 to be mounted on the machine support M, using pre-existing mounting holes in the machine support M that stem from a previously mounted conventional load cell with lateral mounting flanges. Adapter plate mounting bores 520 are provided in the adapter plate.

Figure 5:
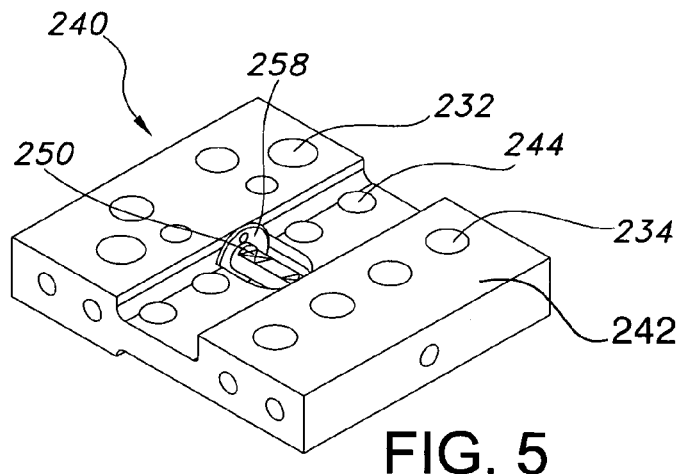
FIG. 5 illustrates sensors mounted on the load beam.
Figure 7:
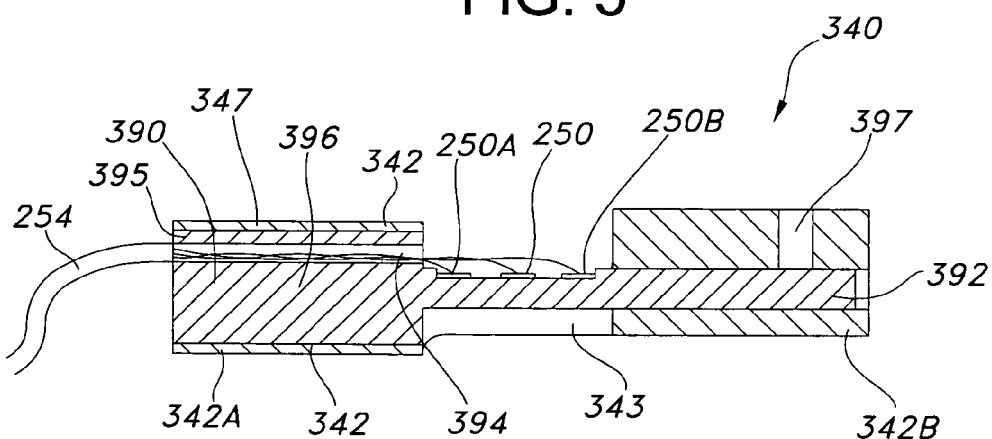
FIG. 7 is a cross-sectional view of the load beam of the first embodiment, showing a sensor assembly plugged into the deflection device.

FIGS. 2 and 5 illustrates sensors 250 mounted directly on the deflection device 242. A small bore hole 258 (as shown in FIG. 5) is provided in the outer end of the deflection device 242 for bringing the sensor leads out to the external sensor cable 254 (as shown in FIGS. 4A and 7). The sensors 250 are encapsulated in an epoxy or other suitable seal mass to protect them from dust, oil, water, etc.

A key feature of the construction of the modular UPB load cell 200 according to the invention is that the deflection and sensor module 240 is quickly and easily replaceable in the field. Should the load beam 243 or sensors 250 fail, the deflection and sensor module 240, which comprises only about 10% of the total weight of the modular UPB load cell 200, is easily replaced by removing the mounting fasteners from the load cell body 220 and lifting the pillow block bearing PB and modular UPB load cell 200 away from the machine support M, generally with the aid of an overhead hoist. This enables access to the bottom surfaces of the deflection and sensor module 240 and to the inner fasteners that attach the deflection and sensing module 240 to the load cell body 220. Once the inner fasteners are removed, the deflection and sensor module 240 is removable from the modular UPB load cell 200. A replacement deflection and sensor module 240 is attachable to the load cell body 220 and the modular UPB load cell 200 then re-mountable to the machine surface M. The process requires only those mechanical skills and tools that are typically available in a production facility.

Figure 6:
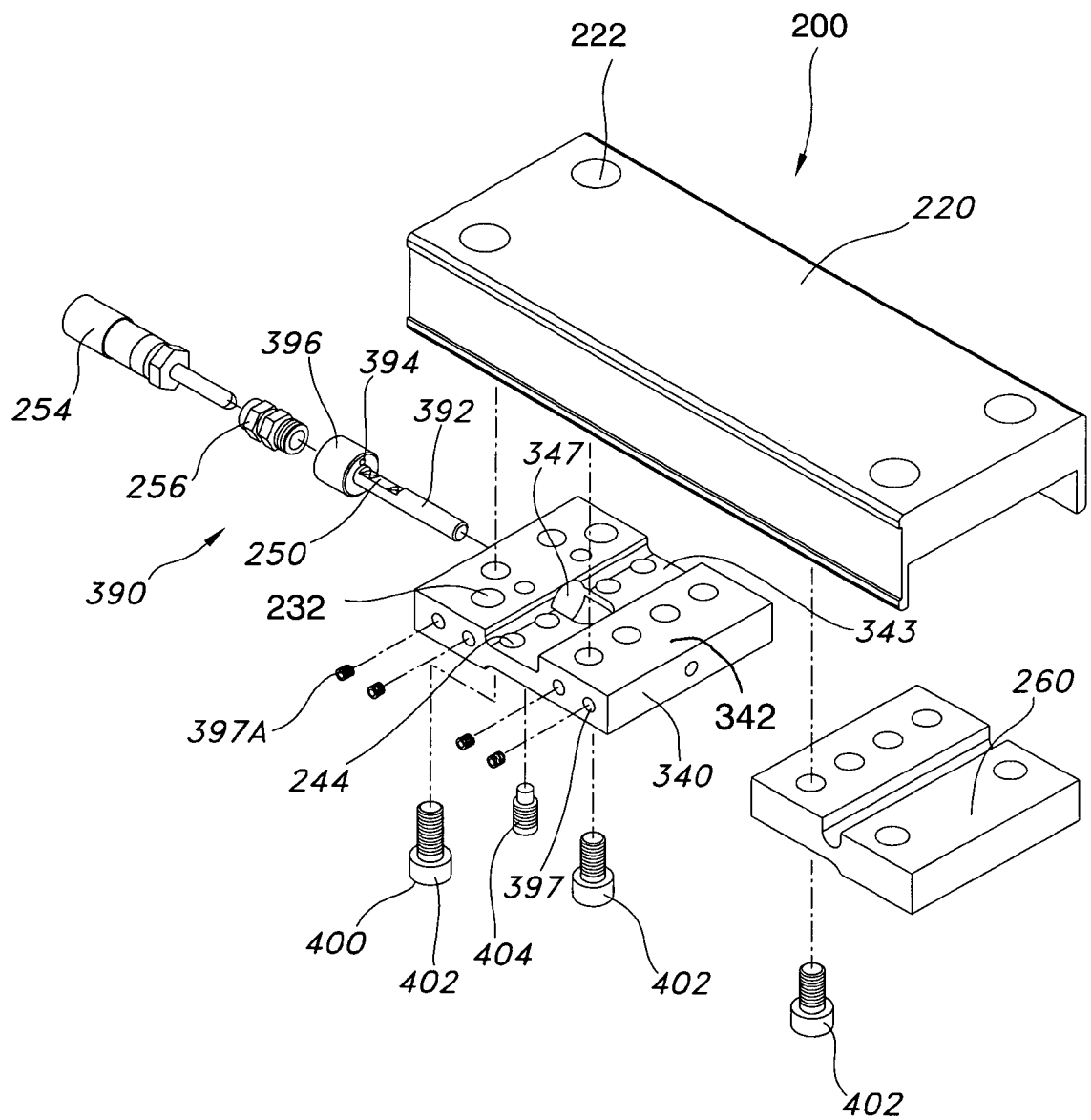
FIG. 6 is a perspective view of the first embodiment of the load cell according to the invention, showing a plug-in sensor assembly and load beam.

FIGS. 6, and 7 illustrate the modular UPB load cell 200, having a modified deflection and sensor module 340 that includes a sensor assembly 390 and a modified deflection device 342. The sensor assembly 390 is a plug-in assembly that includes a plug end 396, a sensor rod 392, and a mounting flange 395. A small bore for sensor leads 394 is provided in the plug end 396. When the sensors 250 are mounted on the deflection sensor rod 392, the sensor leads may be threaded through the small sensor-lead bore 394 and then connected to the external connector means 256 (not shown) for connection to a controller or other device. FIG. 6 is an exploded perspective view of the modular UPB load cell 200 and FIG. 7 a cross-sectional view of the modified deflection and sensor module 340. The load cell body 220 and the hinge 260 are as described above. The modified deflection device 342 has a bore 347 for receiving the plug end 396 and the sensor deflection rod 392 of the sensor assembly 390. The bore 347 extends essentially the length of the modified deflection device 342. The sensor assembly 390 is inserted into the bore 347 and secured within the deflection device 340 via the set screws 397A as shown, or by means of a mounting flange that is removably attachable to the outer end of the deflection and sensor module 340 by threaded fasteners. One or more tapped setscrew bores 397 may be provided on the modified deflection device 340 for securing the sensor rod 392 to the deflection device 340 with one or more setscrews 397A.

The load cell body 220 may be assembled with the deflection and sensor module 240 or the modified deflection and sensor module 340. The modified deflection and sensor module 340 provides the advantage that the sensor assembly 390 may be removed from or inserted into the modular UPB load cell 200 in the field, without first having to remove any other components from the modular UPB load cell 200 or from the machine support M. The sensor assembly 390 does not bear the load L that is exerted on the deflection device 340, but, being securely mounted at the outer end 342A and inner end 342B of the deflection device 342, is merely forced to deflect with the load beam 342. For this reason, the sensor assembly 390 may be constructed of lighter, softer, or more elastic material that deflects easily as the load beam 342 deflects. This offers great advantages, including significant cost savings in the maintenance and repair of the modular UPB load cell 200, because only the sensor assembly 390, which is very light in weight compared to the combination deflection and sensor module 240 need be removed and shipped for maintenace or repair.

FIG. 6 also shows a safety stop 400. This safety stop, although shown only in FIG. 6, is applicable for any embodiment of the modular UPB load cell according to the invention. The safety stops 400 shown include an upward safety stop 402 and a downward safety stop 404. The safety stops 400 prevent the load beam 340/240 from deflecting greater than a certain distance. This is to avoid damage to the load beam in the case of an unforeseen excessive load.

Operation of the modular UPB load cell 200 will now be described. Note: The operation of the modular UPB load cell 200 remains the same, whether assembled with the deflection and sensor module 240 or the modified deflection and sensor module 340. For reasons of simplicity, in the following description, reference shall be made to the deflection and sensor module 240 only, but it should be understood that either of the two deflection and sensor modules 240, 340 may be used. Note also that the load L is shown in FIG. 2 as a downward force. It is understood, however, that the direction of the applied L may be in another direction, including upward from the machine support M or at an angle relative to the vertical direction.

Referring again to FIG. 2, when the modular UPB load cell 200 is assembled and mounted to the machine support M, a load gap 236 is provided above the upper surface of the outer end 242A of the deflection device 242, as well as above the upper surface of the outer end 260A of the hinge 260. A deflection gap 233 is provided beneath the lower surface of the load beam 243 and the inner end 242B of the deflection device 242 and, similarly, a hinge gap 234 provided beneath the lower surface of the inner end 260B of the hinge 260. When the load L is applied to the modular UPB load cell 200, the load gap 236 allows the load cell body 220 to move in the direction of the load L. At the same time, the load cell body 220 forces the inner ends 242B and 260B of the deflection device 242 and the hinge 260 to move with it in the direction of the load L. The inner end 260B of the hinge 260 and the inner end 242B of the deflection device 242 deflect in the direction of the applied load L, which, as shown here, is toward the machine support M.

The sensors 250 may be mounted on the load beam 243 or on the sensor rod 392 in a number of configurations. It is well known in the field to mount strain gauges to obtain an indication of deflection and thus, details of mounting strain gauges and other sensors are not included herein. It shall be noted that the deflection of the inner end 242B, relative to the outer end 242A of the deflection device 242, forces the load beam 243 to deflect in an S-curve, with the outer portion of the load beam 243 in tension and the inner portion in compression. This allows the pair of strain gauges 250A and 250B to be applied to the same surface of the load beam 243 or the sensor rod 392, as shown in FIGS. 6 and 7, one at the portion of the load beam 243 in tension and one at the portion in compression. It is desirable to keep the strain gauges 250 as far from any dirt, grime, water, or other contaminants as possible. Putting them on the upper surface of the load beam 243 or the sensor rod 392 places them on the inside of the load cell 200, well-protected against inadvertent damage, such as, for example, when the underside of the load cell is exposed, or when a stream of forced water is directed at the load cell during a cleaning operation. The sensors 250 are also ideally encased in a water-impermeable mass, such as an epoxy seal, further increasing the degree of protection against water. The fact that the inner end 242B of the deflection device 242 and the inner end 260A of the hinge 260 is assembled on the underside 220A of the load cell body 220, with blind tapped holes that do not extend through the load cell body 220, further improves the ability of the modular UPB load cell 200 to function in harsh environments with a high degree of reliability. This first embodiment of the modular UPB load cell 200 qualifies for an IP rating of 67; that is, dust tight and operational for up to thirty minutes at an immersion depth of fifteen centimeters to one meter.

Figure 8:
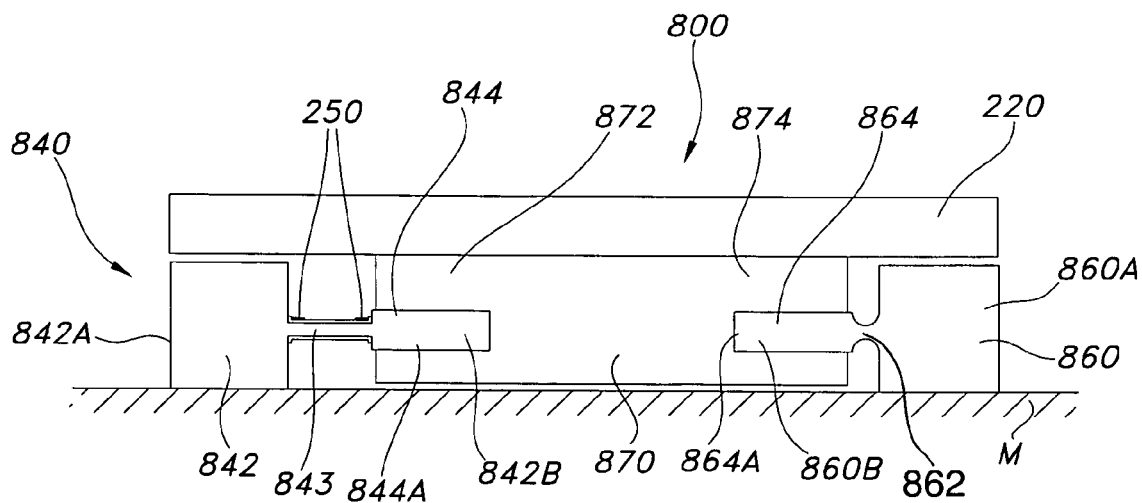
FIG. 8 is a elevational plane view of a second embodiment of the load beam.

FIG. 8 illustrates a second embodiment of a modular UPB load cell 800 according to the invention. The modular UPB load cell 800 comprises four major components: the load cell body 220, a deflection and sensor module 840, and a hinge 860 with hinge pivot 862, and a retainer body 870. The deflection and sensor module 840 includes a deflection device 842 and sensors 250. The deflection device 842 has an outer end 842A and an inner end 842B that is formed as a load beam tongue 844. The hinge 860 has an outer end 860A and an inner end 860B that is formed as a hinge tongue 864. The retainer body 870 has a load beam end 872 and a hinge end 874, both ends of which are flanged ends. A first flanged end 844A provides a groove for receiving the load beam tongue 844 and a second flanged end 864A provides a groove for receiving the hinge tongue 864.

The mounting bores and method of attaching the load deflection and sensor module 840 and the hinge 860 to the machine support M and to the underside 220A of the load cell body 220 are identical to those described above with the first embodiment. It is also possible to modify the construction of the deflection and sensor module 840 to receive the sensor assembly 390 as described above. Furthermore, the descriptions above with regard to mounting the sensors 250 on the deflection and sensor module also apply to this embodiment.

It is understood that the embodiments described herein are merely illustrative of the present invention. Variations in the construction of the UPB load cell may be contemplated by one skilled in the art without limiting the intended scope of the invention herein disclosed and as defined by the following claims.

What is claimed is:

1. A UPB load cell for mounting on a machine support, said UPB load cell comprising:
    a load cell body mountable between a machine support and a machine element;
    a hinge that is attachable to said load cell body; and
    a deflection and sensor module that includes a deflection device and a sensor assembly;
    wherein said load cell body has an upper surface and a lower surface, and said deflection device has an outer device end and an inner device end; and
    wherein said outer device end is fixedly mountable on said machine support and said inner device end is fixedly attachable to said lower side of said load cell body.

2. The UPB load cell of claim 1, wherein a blind tapped hole is provided in said lower side of said load cell body and a through-bore provided in said inner device end of said deflection device, and wherein said deflection device is attachable to said load cell body by means of a threaded fastener threaded through said through-hole into said blind tapped hole.

3. The UPB load cell of claim 1, wherein said sensor assembly includes strain gauges for measuring a deflection of said deflection device.

4. The UPB load cell of claim 1, wherein said deflection device has a bore for receiving said sensor assembly, and wherein said sensor assembly is removably insertable into said deflection device.

5. The UPB load cell of claim 4, wherein said sensor assembly includes a mounting flange with fastening means for removably fixing said sensor assembly in said deflection device.

6. The UPB load cell of claim 5, wherein said sensor assembly includes a sensor rod that, when inserted in said deflection device, extends through said load beam, and wherein said sensors are mountable on said sensor rod.

7. The UPB load cell of claim 6, further comprising a sensor-lead bore, wherein said sensors have sensor leads, and said sensor leads are threadable through said sensor-lead bore for connection to an external connector.

8. The UPB load cell of claim 7, wherein set-screw bores are provided in said deflection device and wherein said sensor assembly is held in precise alignment with said deflection device by set screws fastened in said set-screw bores.

9. The UPB load cell of claim 1, said load cell further comprising a hinge, wherein said hinge has an outer hinge end and an inner hinge end, and wherein said outer hinge end is fixedly mounted on said machine support.

10. The UPB load cell of claim 9, wherein said inner hinge end is fixedly attached to said lower side of said cell body.

11. The UPB load cell of claim 10, wherein a blind tapped hole is provided in said lower side of said load cell body and a through-bore provided in said inner device end of said hinge, and wherein said hinge is attachable to said lower side of said load cell body by means of a threaded fastener threaded through said through-hole into said blind tapped hole.

12. The UPB load cell of claim 1, wherein a first mounting through-bore is provided in said load cell body and a second mounting bore provided in said outer device end for receiving a threaded fastener for affixing said outer device end to said machine support.

13. The UPB load cell of claim 1, further comprising a retainer body having a first forked end, wherein said inner end of said deflection device is insertable into said first forked end and attachable to said lower side of said load cell body through said retainer body.

14. The UPB load cell of claim 13, wherein said retainer body has a second forked end and said hinge has an inner hinge end that is insertable into said second forked end and attachable to said lower side of said load cell body through said retainer body.

15. The UPB load cell of claim 1, wherein said machine support includes an adapter plate that is fixedly attachable to said machine support and said deflection and sensor module and said hinge are mountable on said adapter plate.

* * * * *